US 9,350,783 B2

United States Patent
Tange

(10) Patent No.: US 9,350,783 B2
(45) Date of Patent: May 24, 2016

(54) FLUCTUATION ABSORBING DEVICE, COMMUNICATION DEVICE, AND CONTROL PROGRAM

(71) Applicant: ResoNetz LLC, Nagano (JP)

(72) Inventor: Masahiko Tange, Nagano (JP)

(73) Assignee: Resonetz, LLC (JP)

( * ) Notice: Subject to any disclaimer, the term of this patent is extended or adjusted under 35 U.S.C. 154(b) by 205 days.

(21) Appl. No.: 14/138,781

(22) Filed: Dec. 23, 2013

(65) Prior Publication Data

US 2015/0092787 A1 Apr. 2, 2015

(30) Foreign Application Priority Data

Sep. 30, 2013 (JP) ................................. 2013-203074

(51) Int. Cl.
*G06F 11/00* (2006.01)
*H04J 1/16* (2006.01)
*H04L 12/26* (2006.01)
*H04L 29/06* (2006.01)
*H04L 12/841* (2013.01)
*H04L 12/861* (2013.01)

(52) U.S. Cl.
CPC .............. *H04L 65/80* (2013.01); *H04L 47/283* (2013.01); *H04L 49/9047* (2013.01)

(58) Field of Classification Search
CPC .... H04L 47/283; H04L 65/80; H04L 49/9047
USPC ................ 370/412, 413–419, 395.71, 395.2, 370/395.1, 252–254, 229, 230, 230.1, 370/231–238
See application file for complete search history.

(56) References Cited

U.S. PATENT DOCUMENTS

| | | | | |
|---|---|---|---|---|
| 5,412,642 A * | 5/1995 | Nunokawa | ............ | H04J 3/0632 370/253 |
| 5,764,298 A | 6/1998 | Morrison | | |
| 6,556,568 B2 * | 4/2003 | Sasaki | ................ | H04L 12/5601 370/389 |
| 6,741,601 B1 * | 5/2004 | Tanimura | ................ | H04L 47/10 370/412 |
| 6,928,079 B2 * | 8/2005 | Ono | ...................... | H04L 49/206 370/395.1 |
| 8,861,352 B2 * | 10/2014 | Bejerano | ................. | H04L 12/66 370/229 |

(Continued)

FOREIGN PATENT DOCUMENTS

| JP | 2001-160826 | 6/2001 |
|---|---|---|
| JP | 2003-204492 | 7/2003 |

(Continued)

OTHER PUBLICATIONS

Hoshi et al., "LAN Based Low Delay Real Time Voice Communication System with Adaptive Jitter Control", Information Processing Society of Japan, Jul. 1999, pp. 3063-3074, vol. 40 , No. 7 , Japan.

*Primary Examiner* — Chuong T Ho
(74) *Attorney, Agent, or Firm* — Berenato & White, LLC

(57) ABSTRACT

A fluctuation absorbing device includes a buffer 22 for temporarily storing packets, a pulse generating section 24 for generating a pulse at a same interval as a transmitting interval of the packets, a fluctuation time derivation section (25) for deriving a fluctuation time of delay of the packets based on the pulse, a maximum fluctuation time estimate section (25) for estimating a maximum fluctuation time based on a plurality of fluctuation time derived in the fluctuation time derivation section (25), and a setting section (25) for setting data storage capacity of the buffer 22 based on the maximum fluctuation time.

8 Claims, 11 Drawing Sheets

(56) References Cited

U.S. PATENT DOCUMENTS

| | | | |
|---|---|---|---|
| 2002/0089987 A1* | 7/2002 | Sasaki | H04L 12/5601 370/395.2 |
| 2003/0210681 A1* | 11/2003 | Sumi | H04L 1/22 370/352 |
| 2007/0201498 A1* | 8/2007 | Tanaka | H04L 47/10 370/412 |
| 2011/0292797 A1* | 12/2011 | Bejerano | H04L 12/66 370/230.1 |

FOREIGN PATENT DOCUMENTS

| | | |
|---|---|---|
| JP | 2005-184580 | 7/2005 |
| JP | 2010-219971 | 9/2010 |
| WO | 0055829 | 9/2000 |
| WO | 2011/125737 | 10/2011 |

* cited by examiner (A) IN CASE OF DECREASING NUMBER OF PACKET (B) IN CASE OF INCREASING NUMBER OF PACKET

FLUCTUATION ABSORBING DEVICE, COMMUNICATION DEVICE, AND CONTROL PROGRAM

BACKGROUND OF THE INVENTION

1. Field of the Invention

The present invention relates to a fluctuation absorbing device, a communication device, and a control program, those absorbing fluctuation of delay time of packets.

2. Description of the Related Art

A packet communication system comprises a communication device which packetizes and transmits multimedia data such as sound data and image data. In such packet communication system, fluctuation of delay time of packets is generated depending on the convergence state of transmission lines and communication networks when the communication device transmits the packets through communication networks such as internet networks. As a result, omissions and overlaps of packets are caused and these lead to deterioration of qualities (sound quality and image quality). To prevent this, a communication device on a receiving side comprises a buffer which temporarily stores the received packets. In this way, fluctuation of delay time of the packets is absorbed by temporarily storing the packets in the buffer.

In this regard, Japanese Patent No. 3397191 discloses a communication device which dynamically fluctuates data storage capacity of a buffer (buffer time) according to a fluctuation amount of delay time of packets. This communication device calculates the fluctuation amount of delay time of the packets based on a transmitting time added to the packets and a receiving time of the packets.

SUMMARY OF THE INVENTION

In this way, time of internal clocks needs to be accurately set between the communication devices on the transmitting side and the receiving side when the communication devices calculate the fluctuation amount based on the transmitting time added to the packets and the receiving time of the packets. However, the time of internal clocks in communication devices is not necessarily accurate. In this case, communication devices cannot obtain an accurate fluctuation amount when a time lag occurred between the communication devices on the transmitting side and the receiving side.

The present invention was made to solve such a problem, and the present invention is intended to provide a fluctuation absorbing device, a communication device, and a control program, which are capable of dynamically fluctuating data storage capacity of a buffer based on an accurate fluctuation time.

To achieve the above object, the present invention provides a fluctuation absorbing device comprising a buffer for temporarily storing packets, a pulse generating section for generating a pulse at a same interval as a transmitting interval of the packets, a fluctuation time derivation section for deriving a fluctuation time of delay of the packets based on the pulse, a maximum fluctuation time estimate section for estimating a maximum fluctuation time based on a plurality of fluctuation times derived in the fluctuation time derivation section, and a setting section for setting data storage capacity of the buffer based on the maximum fluctuation time.

In the present invention, the fluctuation time derivation section may measure a time from a generating timing of the pulse to a receiving timing of the packets, and derive the fluctuation time based on a measured time. In this way, an accurate fluctuation time can be derived without accurately synchronizing times between the devices on the transmitting side and the receiving side.

The present invention may further comprise a delay time derivation section for deriving a delay time of the packets on a transmission line, wherein the setting section sets the data storage capacity of the buffer based on the maximum fluctuation time and the delay time. In this way, data storage capacity of a buffer can be set referring not only to a maximum fluctuation time (a maximum width of a fluctuation time), but also a delay time on a transmission line. Therefore, it is capable of handling an unexpected fluctuation of a delay time.

In the present invention, the maximum fluctuation time estimate section can calculate a standard deviation of a plurality of fluctuation times, and estimate the maximum fluctuation time based on the calculated standard deviation. In this way, the possibility of generation of overrun and underrun of a buffer is reduced since almost all of a plurality of fluctuation times are included in the maximum fluctuation time.

The present invention may comprise the buffer having a first buffer for temporarily storing a first packet transmitted via one of the transmission lines and a second buffer for temporarily storing a second packet having the same content as the first packet transmitted via the other transmission line, a time lag detection section for detecting a time lag of receiving timings of the first packet and the second packet, and a modification section for modifying a number of packets stored in the first buffer or in the second buffer and matching the number of the packets of both buffers when the time lag is detected by the time lag detection section. In this way, a time lag of receiving timings of packets due to the difference of delay times of the both transmission lines can be absorbed.

The present invention may comprise the time lag detection section for detecting the time lag based on a time stamp added to the packets. In this way, the time lag can be detected using the existing constitution.

In the present invention, the modification section may execute a data interpolation processing when the modification section modifies a number of packets stored in the first buffer or in the second buffer. In this way, effects of noise can be reduced in case of data switching.

The present invention further provides a communication device comprising a transmitting and receiving section for transmitting and receiving packets, a buffer for temporarily storing the packets received by the transmitting and receiving section, a pulse generating section for generating a pulse at a same interval as a transmitting interval of the packets, a fluctuation time derivation section for deriving a fluctuation time of delay of the packets based on the pulse, a maximum fluctuation time estimate section for estimating a maximum fluctuation time based on a plurality of fluctuation times derived in the fluctuation time derivation section, and a setting section for setting data storage capacity of the buffer based on the maximum fluctuation time.

The present invention further provides a control program causing a control device of a communication device, the control device comprising a buffer for temporarily storing packets, and a pulse generating section for generating a pulse at a same interval as a transmitting interval of the packets, to execute a fluctuation time derivation processing deriving a fluctuation time of delay of the packets based on the pulse, a maximum fluctuation time estimate processing estimating a maximum fluctuation time based on a plurality of fluctuation times derived by the fluctuation time derivation processing, and a setting processing setting a data storage capacity of the buffer based on the maximum fluctuation time.

According to the present invention, data storage capacity of a buffer can be dynamically fluctuated based on an accurate fluctuation time.

DETAILED DESCRIPTION OF THE EXEMPLARY EMBODIMENTS OF THE INVENTION

A description will be given below, of the exemplary embodiments of the present invention with reference to attached drawings. However, the present invention is not limited to these embodiments. Moreover, the drawings may partly be enlarged or emphasized, arbitrarily altering a scale of the drawings to explain the embodiments.

First Embodiment

Figure 1:
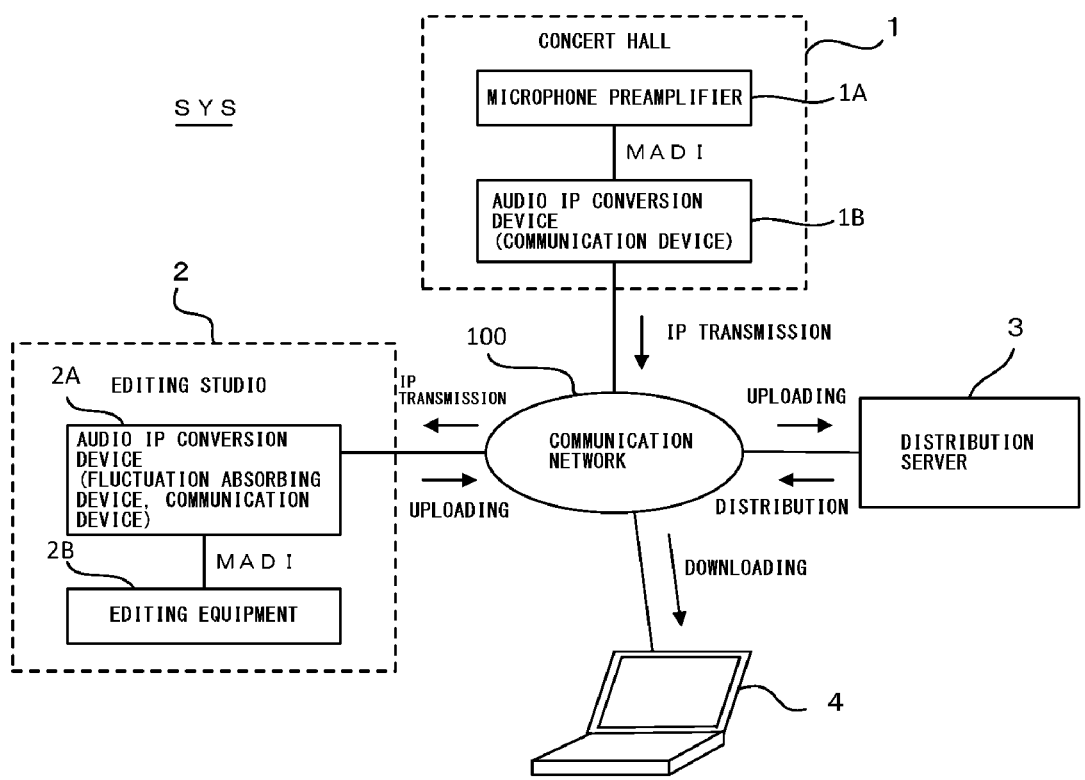
FIG. 1 is a configuration diagram of a recording and distribution system.

FIG. 1 is a configuration diagram of a recording and distribution system. A recording and distribution system SYS shown in FIG. 1 is a system which records sound and distributes the recorded sound data to users in real time. This recording and distribution system SYS comprises a microphone preamplifier 1A, an audio IP conversion device (a communication device) 1B, an audio IP conversion device (a fluctuation absorbing device, a communication device) 2A, an editing equipment 2B, and a distribution server 3 as shown in FIG. 1. The audio IP conversion device 1B and the audio IP conversion device 2A as communication devices in the recording and distribution system SYS configure a packet communication system. In this packet communication system, a two-way transmission of packets is executable between the audio IP conversion device 1B and the audio IP conversion device 2A.

In the example shown in FIG. 1, the microphone preamplifier 1A and the audio IP conversion device 1B are installed in the concert hall 1. In this regard, the concert hall 1 is one of the examples that it can also be places such as clubs with live music. The microphone preamplifier 1A is a device which controls a microphone and also converts a signal picked up by the microphone into MADI (Multichannel Audio Digital Interface) format. Also, the microphone preamplifier 1A can convert a source signal to MADI format, not limiting to the signal picked up by the microphone. In this case, MADI is an interface standard of multichannel digital audio. This MADI can transmit audio signals of a maximum of 64 channels with one cable (an optical fiber or a coaxial cable), binding AES/EBU signals used in digital audio devices. The microphone preamplifier 1A is connected to the audio IP conversion device 1B with a cable, and outputs audio signals in MADI format to the audio IP conversion device 1B.

The audio IP conversion device 1B is a device which converts sound data of audio signals in MADI format to data of IP packets transmittable via IP networks such as internet networks (hereinafter referred to as packets). This audio IP conversion device 1B functions as a communication device which transmits and receives packets. The audio IP conversion device 1B transmits the converted packets to the audio IP conversion device 2A via the communication network 100 which is an IP network. Meanwhile, the cable which connects the microphone preamplifier 1A and the audio IP conversion device 1B can transmit audio signals up to 2000 m that the audio IP conversion device 1B can be installed outside of the concert hall 1.

In the example shown in FIG. 1, audio IP conversion device 2A and editing equipment 2B are installed in editing studio 2. In this regard, editing studio 2 is one example that it can be places other than editing studio 2. Audio IP conversion device 2A is connected to communication network 100 and also to editing equipment 2B by a cable. This audio IP conversion device 2A converts packets transmitted from audio IP conversion device 1B to sound data of audio signal in MADI format and outputs converted sound data to editing equipment 2B via a cable. Also, audio IP conversion device 2A converts sound data of audio signal in MADI format outputted from editing equipment 2B into packets and transmits (uploads) the converted packets to distribution server 3 via communication network 100. This audio IP conversion device 2A functions as communication device which transmits and receives packets.

Editing equipment 2B is a device which enters audio signal in MADI format outputted from audio IP conversion device 2A and edits sound data of the entered audio signal. This editing equipment 2B outputs the edited sound data to audio IP conversion device 2A via a cable.

Distribution server 3 is a server which distributes sound data to user terminal 4 in response to distribution requests from user terminal 4. Distribution server 3 receives packets transmitted from audio IP conversion device 2A and stores the received packets in a storage section of distribution serer 3 converting them to sound data. Moreover, distribution server 3 distributes sound data to user terminal 4 via communication network 100 when distribution requests are received from the user terminal 4. User terminal 4 is a terminal such as a personal computer owned by a user. A user controls user terminal 4 and downloads sound data from distribution server 3.

According to such composition of recording and distribution system SYS, it is possible that concert music is recorded in concert hall 1, an editor edits music real time in editing studio 2, and a user downloads music from distribution server 3.

Figure 2:
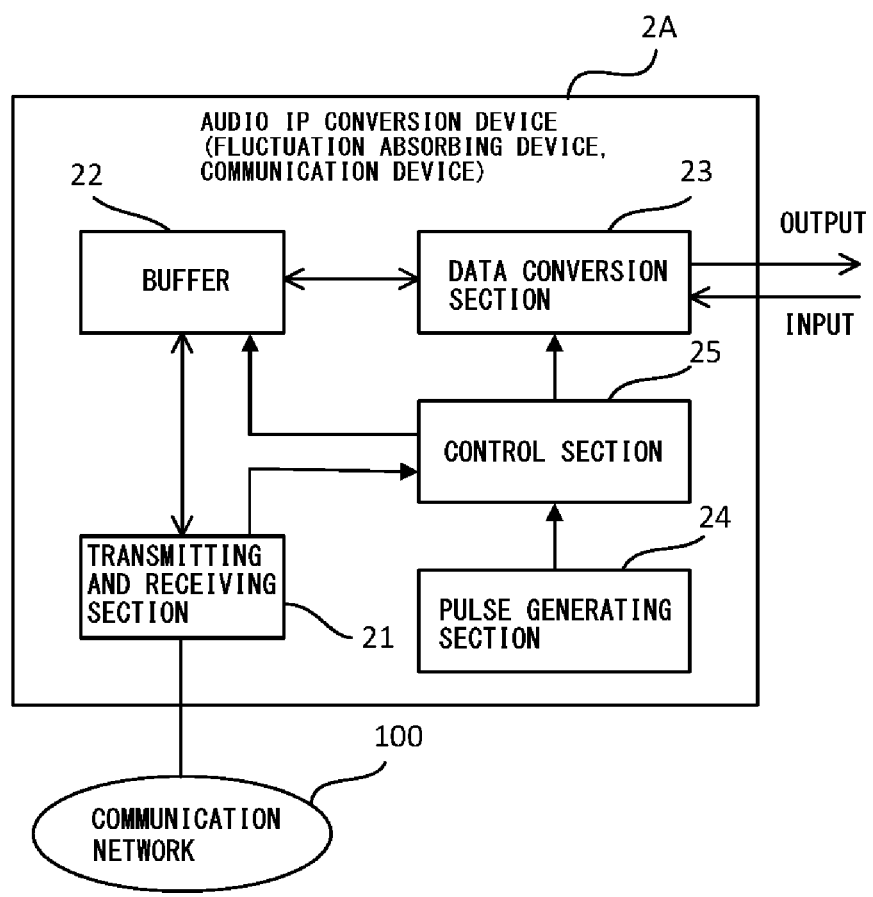
FIG. 2 is a block diagram of an audio IP conversion device according to a first embodiment of the present invention.

FIG. 2 is a block diagram showing a composition of audio IP conversion device 2A according to the first embodiment of the present invention. As shown in FIG. 2, audio IP conversion device 2A comprises transmitting and receiving section 21, buffer 22, data conversion section 23, pulse generating section 24, and control section (fluctuation time derivation section, maximum fluctuation time estimate section, setting section) 25. Transmitting and receiving section 21 transmits and receives packets via communication network 100. Buffer 22 temporarily stores packets in order to absorb fluctuation of delay time of packets. Data conversion section 23 converts the packets from buffer 22 to sound data of audio signal in MADI format. The data-converted sound data (audio signal) by data conversion section 23 is output to editing equipment 2B. Moreover, data conversion section 23 enters sound data of audio signal in MADI format and converts the entered sound data into packets.

Pulse generating section 24 generates clock pulse (see clock pulse CP in FIG. 4) at the same interval as the transmission interval of packets in audio IP conversion device 1B. This pulse generating section 24 comprises an oscillator or the like which stably generates clock pulse CP.

Control section 25 is responsible for control of each part of audio IP conversion device 2A. Specifically, control section 25 derives absolute delay time of an initial packet on a transmission line (see ti1 in FIG. 5). Also, control section 25 measures a time from generating timing of clock pulse by pulse generating section 24 to receiving timing of packets by transmitting and receiving section 21 (see tc1~tcn+1 in FIG. 6). Furthermore, control section 25 derives fluctuation time (fluctuation amount) of delay time of packets based on the measured time. Also, control section 25 estimates maximum fluctuation time which is a maximum value (peak value) of fluctuation time based on fluctuation time of delay time of a plurality of packets. Then, control section 25 sets data storage capacity of buffer 22 based on the maximum fluctuation time and the absolute delay time. Also, control section 25 causes data conversion section 23 to execute data conversion by outputting a control signal to data conversion section 23. Meanwhile, control section 25 is realized by control devices such as CPU (Central Processing Unit) and processors which execute the aforementioned control based on a control program.

Also, Audio IP conversion device 1B can comprise the same composition as audio IP conversion device 2A shown in FIG. 2. Audio IP conversion device 1B comprises a pulse generating section which generates clock pulse at the same interval as the generation of clock pulse in pulse generating section 24 and transmits packets synchronously with clock pulse from this pulse generating section.

The smaller the data storage capacity (size) of buffer 22, the shorter the time until packets transmitted from audio IP conversion device 1B reach at editing equipment 2B. However, when data storage capacity of buffer 22 is small, fluctuation of delay time of packets in buffer 22 cannot be absorbed if fluctuation of delay time of packets on a transmission line including communication network 100 is large. On the contrary, the larger the data storage capacity of buffer 22, the longer the time until packets transmitted from audio IP conversion device 1B reach at editing equipment 2B. In this case, it will be a problem for a system which records and distributes real time and a system which executes two-way transmission of sound.

Moreover, fluctuation of delay time in communication network 100 depends on the condition of communication network 100 (such as a path selected as a transmission line of packets and traffic) at the time of transmission of packets that optimal data storage capacity (setting value) of buffer 22 keeps changing. Furthermore, it is highly possible that sudden large fluctuation is generated if the breadth of fluctuation of delay time is large. In this case, a large value needs to be set as data storage capacity of buffer 22. In this regard, control section 25 automatically sets data storage capacity of buffer 22 based on fluctuation of delay time of a plurality of packets in the present embodiment.

Figure 3:
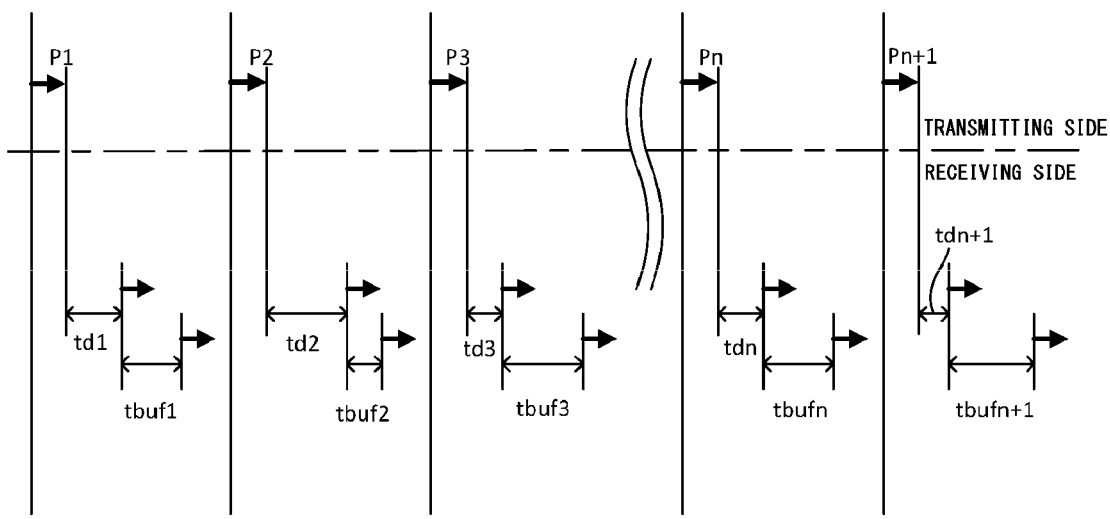
FIG. 3 is a view for explaining a delay time of packets on a transmission line.

FIG. 3 is a figure explaining delay time of packets on a transmission line. As shown in FIG. 3, audio IP conversion device 1B (communication device on the transmitting side) transmits the packets P1, P2, . . . , Pn, Pn+1, . . . at a regular interval. Each packet P1, P2, . . . , Pn, Pn+1, . . . reaches at audio IP conversion device 2A (communication device on the receiving side) after a lapse of delay time td1, td2, . . . , tdn, tdn+1, . . . . In audio IP conversion device 2A, each packet P1, P2, . . . , Pn, Pn+1, . . . received in transmitting and receiving section 21 is temporarily stored in buffer 22. Each packet P1, P2, . . . , Pn, Pn+1, . . . stored in buffer 22 is read out at a regular interval. Therefore, time stored in buffer 22 tbuf1, tbuf2, . . . , tbufn, tbufn+1, . . . changes with respect to each packet P1, P2, . . . , Pn, Pn+1, . . . .

In the example shown in FIG. 3, all packets can be stored in buffer 22 without any interruption when data storage capacity of buffer 22 is set in conformity to the maximum delay time td2 in delay time of each packet. In this case, sound is reproduced without interruption. However, unexpected increase in delay is caused when fluctuation of delay time on a transmission line is large. Therefore, there is a possibility that buffer 22 cannot absorb fluctuation of delay time because of increased unexpected delay time even if data storage capacity of buffer 22 is set based merely on the maximum delay time td2. Thus, control section 25 calculates and sets data storage capacity of buffer 22 by the method explained below.

Figure 4:
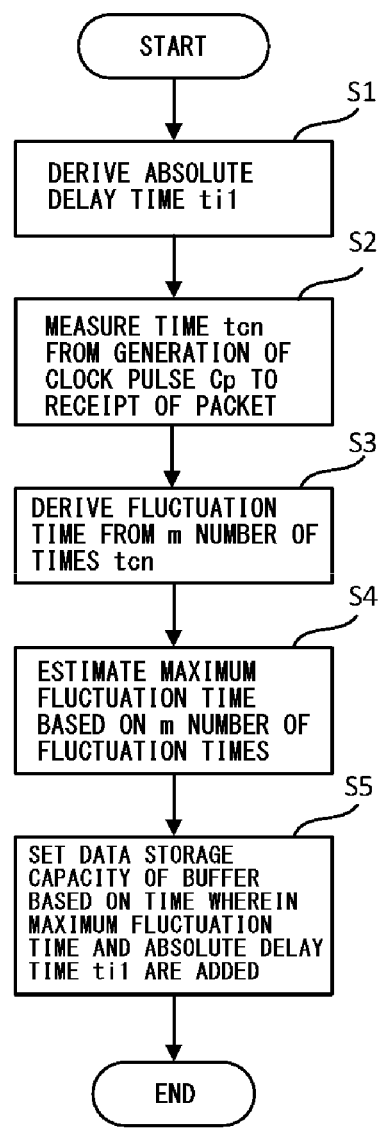
FIG. 4 is a flowchart of a setting processing of a buffer according to the first embodiment of the present invention.

Next, operation of audio IP conversion device 2A of the first embodiment is explained. FIG. 4 is a flowchart showing buffer setting processing of the first embodiment. In the processing shown in FIG. 4, control section 25 first derives absolute delay time ti1 of initial packet P1 on a transmission line by transmitting and receiving initial packet P1 between audio IP conversion device 1B (Step S1).

Figure 5:
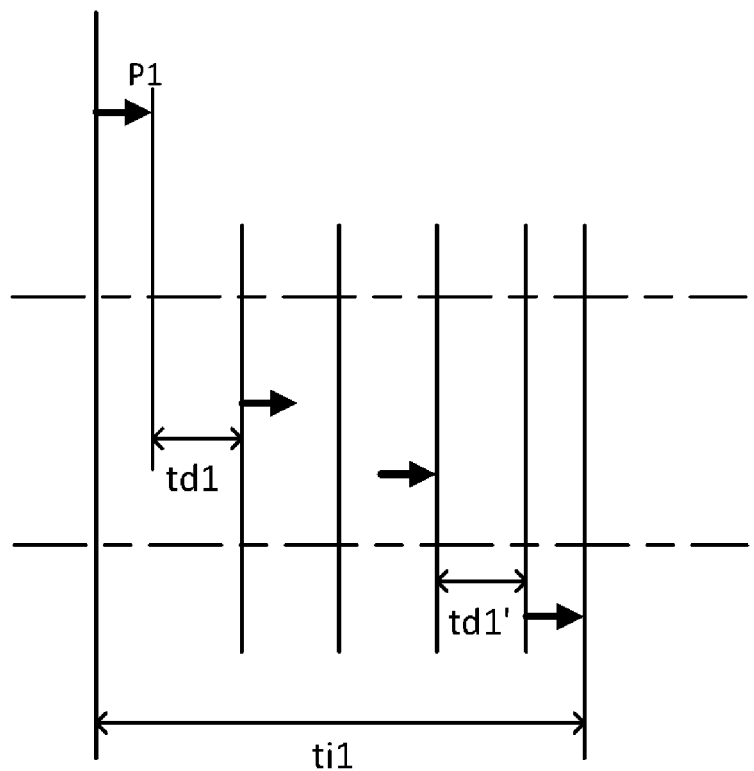
FIG. 5 is a view for explaining an absolute delay time.

FIG. 5 is a figure explaining absolute delay time ti1. As shown in FIG. 5, when initial packet P1 is transmitted by audio IP conversion device 1B, transmitting and receiving section 21 of audio IP conversion device 2A receives initial packet P1 after a lapse of delay time td1 from transmitting timing of initial packet P1. Transmitting and receiving section 21 outputs reception information indicating that initial packet P1 is received to control section 25 when receiving initial packet P1. Control section 25 instructs transmitting and receiving section 21 to retransmit initial packet P1 to audio IP conversion device 1B when receiving reception information from transmitting and receiving section 21. Transmitting and receiving section 21 transmits initial packet P1 to audio IP conversion device 1B based on an instruction from control section 25. Audio IP conversion device 1B receives initial packet P1 after a lapse of delay time td1' from transmitting timing of initial packet P1 by transmitting and receiving section 21.

Audio IP conversion device 1B derives round-trip delay time ti1 on a transmission line between audio IP conversion device 1B and audio IP conversion device 2A from transmitting timing (transmitting time) of initial packet P1 and receiving timing (receiving time) of initial packet P1. Audio IP conversion device 1B regards round-trip delay time ti1 as absolute delay time and transmits information indicating this absolute delay time ti1 to audio IP conversion device 2A. When transmitting and receiving section 21 of audio IP conversion device 2A receives information indicating absolute delay time ti1, it outputs this information to control section 25.

Absolute delay time ti1 on a transmission line is determined by a length of the transmission line (path) through which packets pass and number of equipments (routers and the like) through which packets pass. The larger the absolute delay time ti1, the more likely that the breadth of fluctuation of delay time (maximum fluctuation time) becomes large. Therefore, absolute delay time ti1 becomes a factor influencing fluctuation of delay time.

Figure 6:
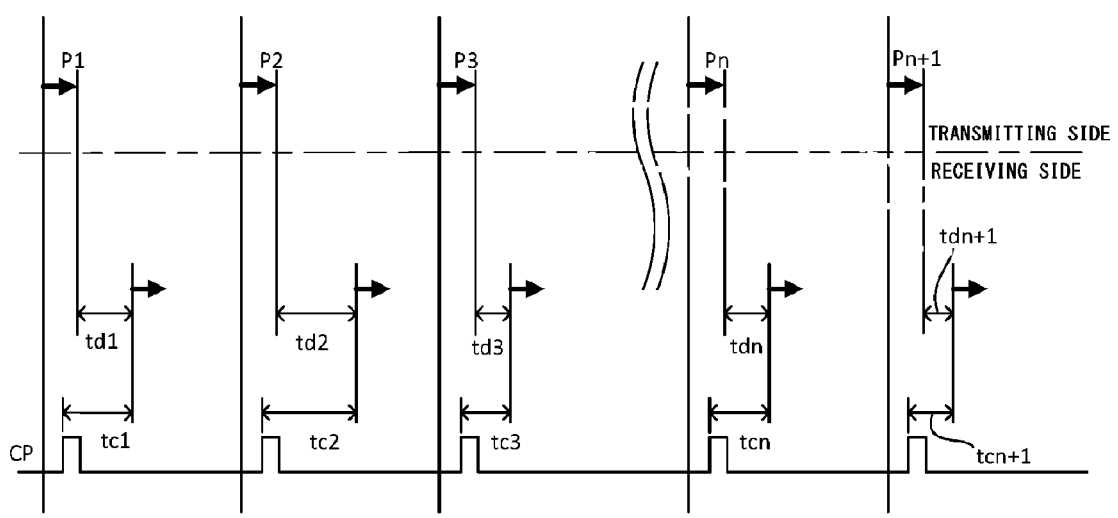
FIG. 6 is a view for explaining a measuring principle of a fluctuation time.

Next, control section 25 measures time tcn from generating timing of clock pulse CP by pulse generating section 24 to receiving timing of packet Pn (Step S2). FIG. 6 is a figure explaining a measuring principle of fluctuation time. Transmitting and receiving section 21 outputs reception information indicating that packets are received to control section 25 each time a packet is received. As shown in FIG. 6, control section 25 measures time tcn from generating timing of clock pulse CP just before receiving reception information to receiving timing of reception information when reception information is received from transmitting and receiving section 21.

Then, control section 25 derives fluctuation time of packet Pn from m times (tcn−m, . . . , tcn−1, tcn) (Step S3). Specifically, control section 25 calculates an average of m times (tcn−m, . . . , tcn−1, tcn) from time tcn-m of packet Pn-m (packet m pieces before packet Pn) to time tcn of packet Pn. Also, control section 25 derives fluctuation time of delay time of packet Pn by deducting (subtracting) the average of m times (tcn−m, . . . , tcn−1, tcn) from time tcn.

Next, control section 25 estimates a maximum fluctuation time (namely, a maximum breadth of fluctuation) based on m fluctuation time (fluctuation time from packet Pn-m to packet Pn) (Step S4). In this embodiment, control section 25 calculates the standard deviation $\sigma$ of m pieces of fluctuation time and regards the value of $3\sigma$ as a maximum fluctuation time. The standard deviation $\sigma$ is a value indicating the scattering condition (dispersion) of data. Most of the m fluctuation time is included in the value of $3\sigma$ by using the value of $3\sigma$ for a maximum fluctuation time.

Meanwhile, control section 25 may use a maximum time within m fluctuation time for a maximum fluctuation time instead of calculating a maximum fluctuation time using a standard deviation (indicating normal distribution of fluctuation time). Also, control section 25 may use an average of m fluctuation time for a maximum fluctuation time.

Then, control section 25 sets data storage capacity of buffer 22 based on the added time of absolute delay time ti1 obtained in Step S1 and a maximum fluctuation time estimated in Step S4 (Step S5). Data storage capacity of buffer 22 corresponds with time until packets stored in buffer 22 is read out (buffer time) and the number of packets storable in buffer 22.

The packets read out from buffer 22 are data-converted in data conversion section 23 and output to editing equipment 2B.

As explained above, the first embodiment comprises buffer 22 which temporarily stores packets, pulse generating section 24 which generates pulse at the same interval as the transmitting interval of packets, fluctuation time derivation section (25) which derives fluctuation time of delay of packets, maximum fluctuation time estimate section (25) which estimates a maximum fluctuation time based on a plurality of fluctuation time derived from fluctuation time derivation section (25), and setting section (25) which sets data storage capacity of buffer 22 based on the maximum fluctuation time. According to such composition, data storage capacity of buffer 22 can be dynamically fluctuated based on an accurate fluctuation time.

Moreover, fluctuation time derivation section (25) measures time from pulse generating timing to receiving timing of packets and derives fluctuation time based on the measured time in the first embodiment. According to such composition, accurate fluctuation time can be derived without accurately synchronizing time between the device on transmitting side 1B and the device on receiving side 2A.

Also, the first embodiment comprises delay time derivation section (25) which derives delay time (absolute delay time) of packets on a transmission line and setting section (25) sets data storage capacity of buffer 22 based on maximum fluctuation time and delay time. According to such composition, data storage capacity can be set referring not only maximum fluctuation time (maximum breadth of fluctuation time), but also delay time on a transmission line. Therefore, it is capable of handling unexpected fluctuation of delay time.

Moreover, maximum fluctuation time estimate section (25) calculates a standard deviation of a plurality of fluctuation time, and estimates maximum fluctuation time based on the calculated standard deviation in the first embodiment. According to such composition, the possibility of generation of overrun and underrun of buffer 22 is reduced since almost all of a plurality of fluctuation time is contained in the maximum fluctuation time.

Second Embodiment

A transmission error such as a loss may occur during transmission of packets. To prevent interruptions of sound caused by such transmission error, packets are generally transmitted using more than two lines of transmission lines. However, delay time (absolute delay time) of packets varies depending on a transmission line. Moreover, such delay time changes with time. As a result, fluctuation of delay time of packets is caused. Therefore, an audio IP conversion device on the receiving side cannot simultaneously receive the packets of the same data even if an audio IP conversion device on the transmitting side simultaneously transmitted the packets of the same data. Thus, sound data is interrupted and becomes unnatural if an audio IP conversion device on the receiving side executes switching of sound data based on occurrence of a transmission error. Accordingly, buffers are equipped corresponding to more than two lines of transmission lines, and the difference of delay time on each transmission line of the buffers is corrected in the second embodiment.

Figure 7:
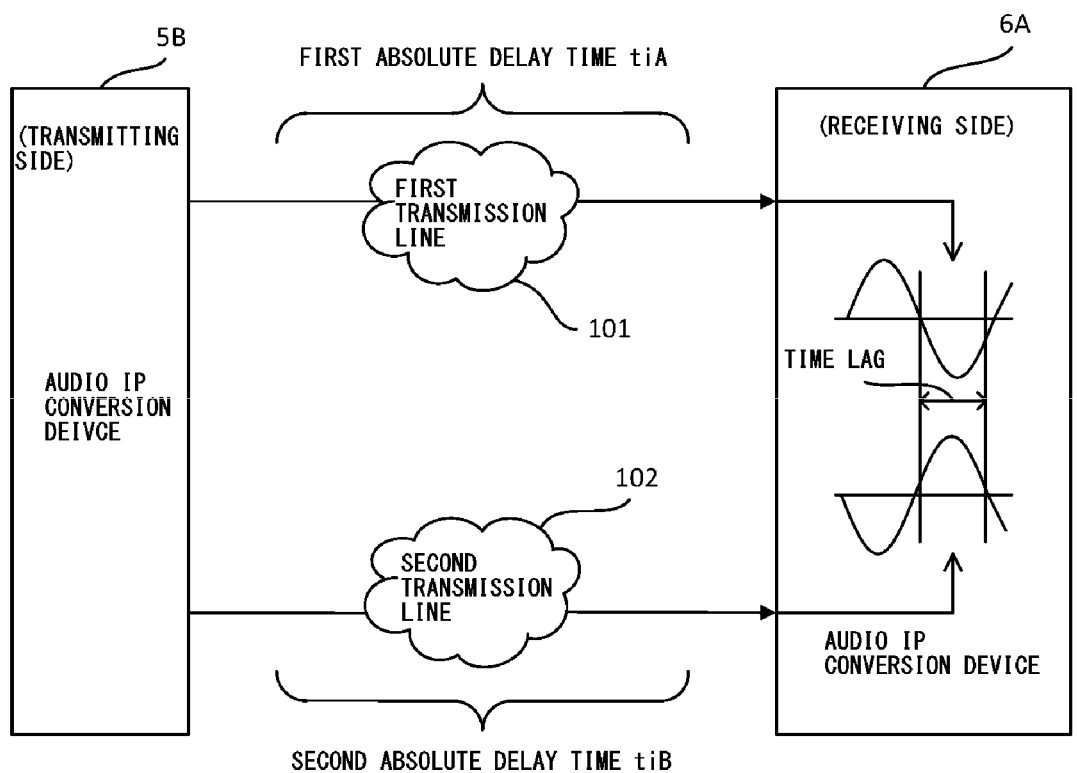
FIG. 7 is a view showing a redundant configuration for transmission lines.

FIG. 7 is a figure showing a redundant configuration for a transmission line. In the second embodiment, audio IP conversion device 5B on the transmitting side and audio IP conversion device 6A on the receiving side execute transmitting and receiving of packets via first transmission line 101 and second transmission line 102 as shown in FIG. 7. Meanwhile, audio IP conversion device 5B is a device which, for instance, corresponds to audio IP conversion device 1B in the first embodiment, and audio IP conversion device 6A is a device which, for instance, corresponds to audio IP conversion device 2A in the first embodiment.

Also, absolute delay time of first transmission line 101 is tiA and absolute delay time of second transmission line 102 is tiB. In this case, audio IP conversion device 6A of the receiving side receives the packets while leaving time difference even if audio IP conversion device 5B of the transmitting side simultaneously transmits each of the same packets via first transmission line 101 and second transmission line 102 as shown in FIG. 7.

Figure 8:
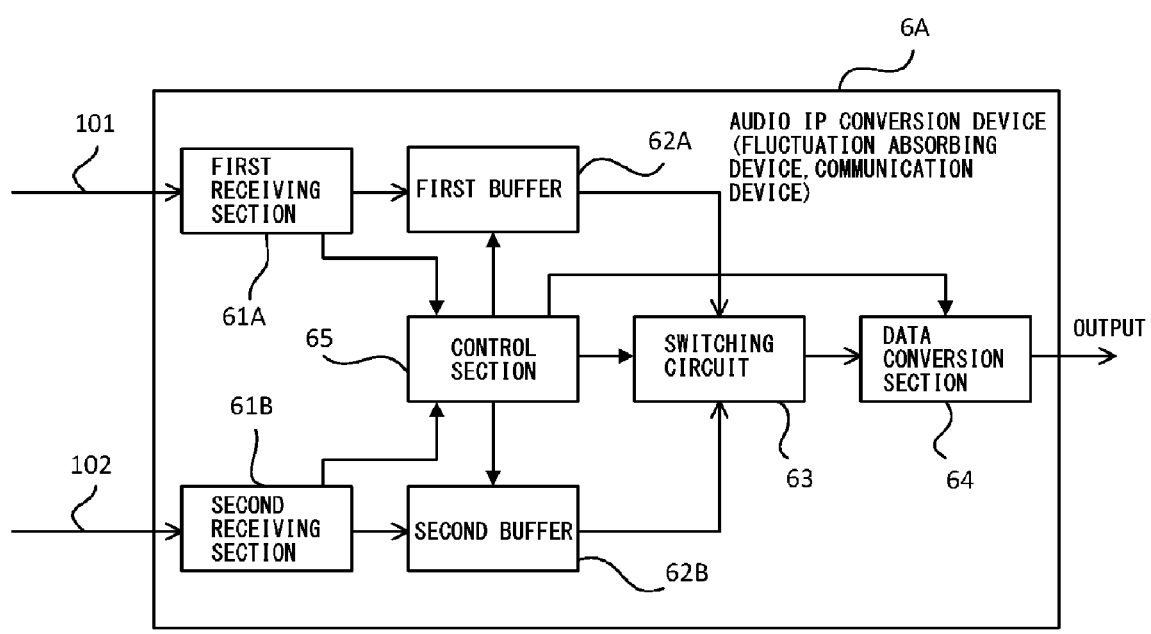
FIG. 8 is a block diagram of an audio IP conversion device according to a second embodiment of the present invention.

FIG. 8 is a block diagram showing a composition of an audio IP conversion device according to the second embodiment. Audio IP conversion device (fluctuation absorbing device, communication device) 6A shown in FIG. 8 comprises first receiving section (transmitting and receiving section) 61A, second receiving section (transmitting and receiving section) 61B, first buffer 62A, second buffer 62B, switching circuit 63, data conversion section 64, and control section (delay time derivation section, time lag detection section, modification section) 65.

As shown in FIG. 8, first receiving section 61A is connected to first transmission line 101 and receives packets transmitted via first transmission line 101. Second receiving section 61B is connected to second transmission line 102 and receives packets transmitted via second transmission line 102. First buffer 62A temporarily stores packets received by first receiving section 61A. Second buffer 62B temporarily stores packets received by second receiving section 61B. In the second embodiment, when control section 65 modifies numbers of packets stored in one of the two buffers 62A and 62B in conformity with numbers of packets stored in the other buffer, the time difference in receiving timing of packets is absorbed.

Switching circuit 63 is a circuit which switches transmission lines (data) based on the occurrence of transmission errors. Specifically, switching circuit 63 switches between packets of first buffer 62A and packets of second buffer 62B when a transmission error occurs. This switching circuit 63 executes switching of transmission lines based on a control signal from control section 65. Data conversion section 64 converts packets into sound data of audio signal in MADI format.

Control section 65 is responsible for control of each part of audio IP conversion device 6A. Specifically, control section 65 detects time difference of receiving timing of packets transmitted via two transmission lines 101 and 102. Also, control section 65 determines whether the detected time difference is equal to or more than specific time or not. Control section 65 executes a data interpolation processing when the time difference is determined to be equal to or more than specific time. Moreover, control section 65 modifies (sets) numbers of packets stored in one of the two buffers 62A and 62B in conformity with numbers of packets stored in the other buffer to resolve the time difference. Also, control section 65 determines whether a transmission error occurred or not. Control section 65 causes switching circuit 63 to execute switching of transmission lines by outputting a control signal to switching circuit 63 when it determined that a transmission error occurred. Meanwhile, control section 65 is realized by control devices such as CPU and processors which execute the aforementioned control based on a control program.

Although FIG. 8 only shows a composition of a part which receives packets within audio IP conversion device 6A (a composition of packet receiving device), it also comprises a composition of a part which transmits packets (a composition of packet transmitting device). A composition of a packet transmitting device at least comprises a data conversion section which converts sound data of audio signal in MADI format to packets, a first transmitting section which transmits packets to first transmission line 101, and a second transmitting section which transmits packets to second transmission line 102.

Figure 9:
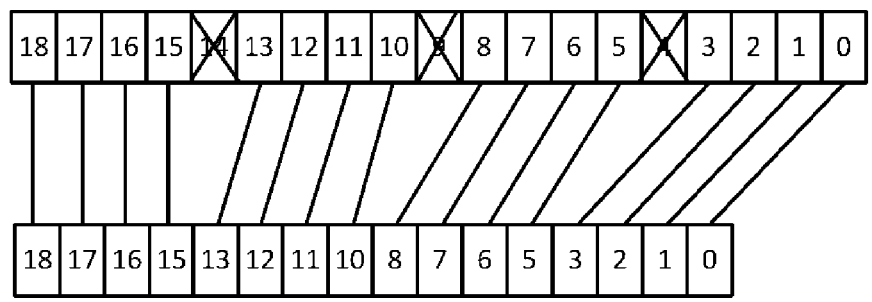
FIG. 9 is a view for explaining thinning and insertion of a data sample.
Figure 9:
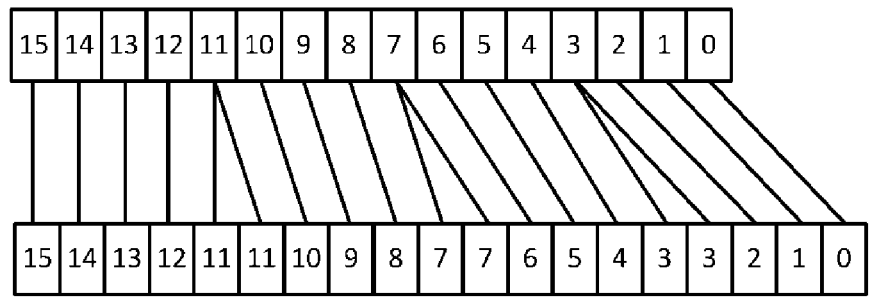

FIG. 9 is a figure explaining thinning and insertion of a data sample. The delay time of two transmission lines 101 and 102 each changes depending on the condition of those transmission lines 101 and 102. Therefore, the time difference of receiving timing of two packets (packets transmitted via two transmission lines 101 and 102) changes depending on the condition of those transmission lines 101 and 102.

As shown in FIG. 9, packets are decreased or increased when control section 65 changes numbers of packets of first buffer 62A or second buffer 62B so as to resolve a time difference. As shown in FIG. 9 (A), thinning of packets is considered when control section 65 decreases numbers of packets in a buffer. In the example shown in FIG. 9 (A), control section 65 thins out (deletes) the fourth packet, the ninth packet, and the fourteenth packet that 19 packets are decreased to 16 packets. Moreover, as shown in FIG. 9(B), the same packet can be inserted when control section 65 increases the number of packets in the buffer. In the example shown in FIG. 9(B), control section 65 copies and inserts the third packet, the seventh packet, and the eleventh packet that 16 packets are increased to 19 packets. However, discontinuous parts are generated in sound waveform when packets are connected, and the discontinuous parts emerge as noises according to such method. Therefore, control section 25 changes the number of packets in the buffer according to time lag of packets by the method explained below.

Figure 10:
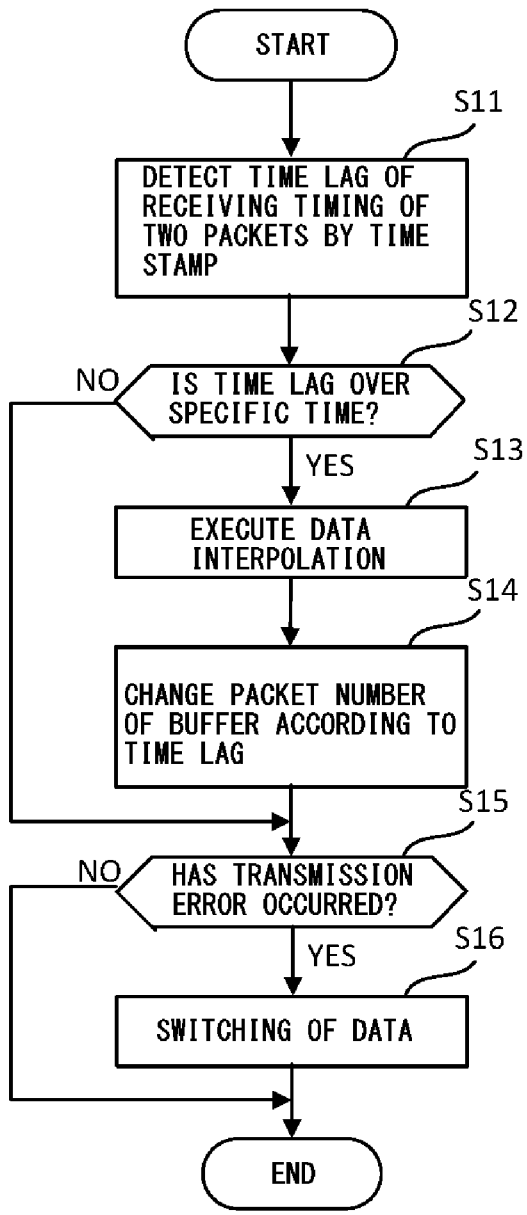
FIG. 10 is a flowchart of a modification processing of a buffer according to the second embodiment of the present invention.

Next, an operation of audio IP conversion device 6A according to the second embodiment is explained. FIG. 10 is a flowchart showing a change processing of buffers according to the second embodiment. In the processing shown in FIG. 10, control section 65 detects time lag of receiving timing of two packets transmitted via two transmission lines 101 and 102 with a time stamp (Step S11).

Specifically, first receiving section 61A recognizes a time stamp added to the packet header after receiving a packet from first transmission line 101. The time stamp stores transmitting time when audio IP conversion device 5B transmits a packet. First receiving section 61A outputs time information to control section 65, time information indicates transmitting time stored in the time stamp and receiving time when first receiving section 61A receives the packet. Similarly, second receiving section 61B recognizes a time stamp added to the packet header after receiving a packet from second transmission line 102. Second receiving section 61B outputs time information to control section 65, time information indicates transmitting time stored in the time stamp and receiving time when second receiving section 61B receives the packet. Control section 65 determines if two packets are the same packets or not based on transmitting time of time information output from first receiving section 61A and second receiving section 61B. Also, control section 65 detects a time lag of receiving timing of two packets based on receiving time of time information when two packets are determined as identical. In this way, transmitting time of a time stamp is used so that control section 65 confirms if the packet sequence is correct or not (the packet sequence could be switched by overtaking during transmission). Therefore, internal clocks of audio IP conversion device on the transmitting and receiving sides need not be accurately synchronized.

Figure 11:
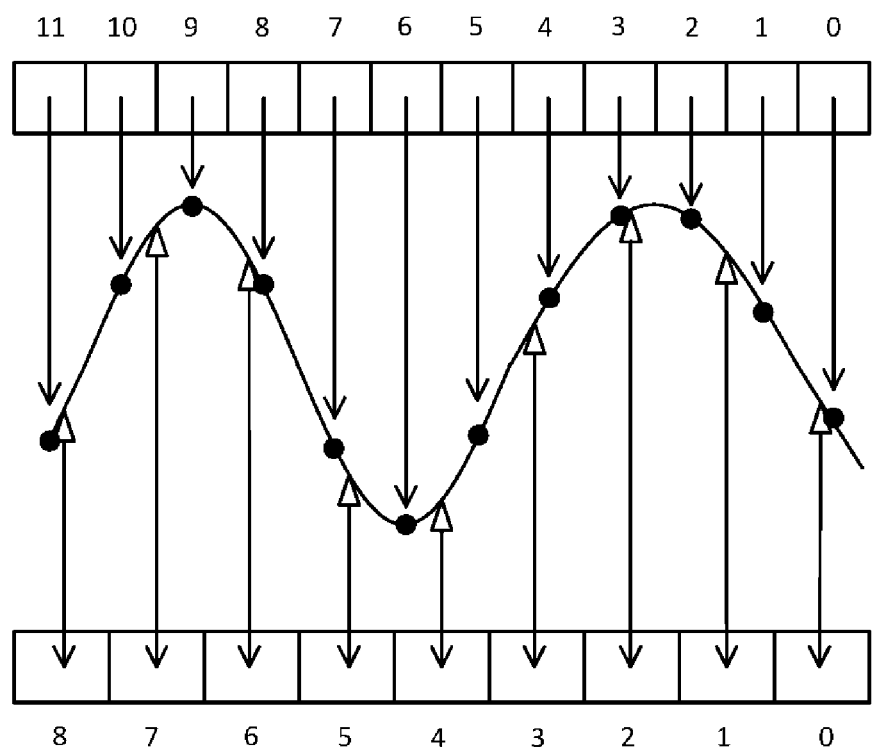
FIG. 11 is a view for explaining a data interpolation.

Then, control section 65 determines if the time lag detected in Step S11 is equal to or more than specific time or not (Step S12). In this case, the specific time is a time when three packets are read out at a regular interval from the buffer, for example. Control section 65 executes data interpolation in first buffer 62A or second buffer 62B if time lag is determined to be equal to or more than specific time (Step S13). FIG. 11 is a figure explaining data interpolation. In the example shown in FIG. 11, 12 packets are stored in one buffer (the upper stage of FIG. 11) and 9 packets are stored in the other buffer (the lower stage of FIG. 11). Control section 65 calculates waveform of a smooth curve passing through each point corresponding to sound data of 12 packets using a polynomial when 12 packets are decreased to 9 packets in the buffer. Then, control section 65 derives 9 points at equal intervals in the calculated waveform and stores sound data corresponding to the 9 points in 9 packets.

Meanwhile, control section 65 calculates waveform of a smooth curve passing through each point corresponding to sound data of 9 packets using a polynomial when 9 packets are increased to 12 packets in the buffer. Then, control section 65 derives 12 points at equal intervals in the calculated waveform and stores sound data corresponding to the 12 points in 12 packets.

As for methods for executing such data interpolation (interpolation of data samples), such methods like Lagrangian interpolation, Newton interpolation, linear interpolation, and quadratic curve approximation can be used.

Control section 65 decreases or increases the number of packets in first buffer 62A or second buffer 62B according to the time lag detected in Step S11 (Step S14). Specifically, control section 65 stores packets in first buffer 62A or second buffer 62B following data interpolation executed in Step S13. Accordingly, the number of packets stored in two buffers 62A and 62B become the same. Meanwhile, either one of two buffers 62A and 62B can be selected as a buffer wherein the number of packets is changed. However, control section 65 determines a buffer wherein the number of packets is changed in accordance with the proportion of actual storage amount (data amount of actual stored packets) to data storage capacity of each buffer (size of a buffer).

Next, control section 65 determines if a transmission error is generated or not (Step S15). Control section 65 determines that a transmission error is generated when it is determined that loss of packets and switch in packet sequence occurred based on a time stamp of packets, for instance. Control section 65 causes switching circuit 63 to execute switching of data (switching of transmission lines) by outputting a control signal to switching circuit 63 when determined that a transmission error was generated (Step S16). In this case, discontinuous parts are not generated in sound waveform and generation of noise is reduced even if switching of data is executed.

As explained above, in the second embodiment, buffers include first buffer 62A which temporarily stores a first packet transmitted via one transmission line 101 and second buffer 62B which temporarily stores a second packet having the same content as the first packet transmitted via the other transmission line 102, and time lag detection section (65) which detects time lag of receiving timing of the first packet and the second packet, and modification section (65) which modifies the number of packets stored in first buffer 62A or second buffer 62B and conforms the number of packets in the both buffers when time lag was detected in time lag detection section (65). According to such composition, time lag of receiving timing of packets due to the difference of delay time of the both transmission lines 101 and 102 can be absorbed.

Furthermore, in the second embodiment, time lag detection section (65) detects time lag based on a time stamp added to packets that time lag can be detected using the existing constitution.

Also, in the second embodiment, modification section (65) executes data interpolation processing when modifying the number of packets stored in first buffer 62A or second buffer 62B that effect of noise can be reduced in case of data switching.

The embodiments of the present invention were explained above, however, the technical scope of the present invention is not limited to the scope of the description in the above embodiments. Various modifications and improvements should be possible in the above embodiments without departing from the spirit of the present invention. Also, one or more requirements explained in the above embodiments can be omitted. The technical scope of the present invention also includes the embodiments wherein such modifications, improvements, and omissions are made. Moreover, it should be possible to apply by appropriately combining the constitutions of the above-described embodiments and the variations.

In the above first and the second embodiments, a fluctuation absorbing device can also be audio IP conversion device 1B and audio IP conversion device 5B, not limiting to audio IP conversion device 2A and audio IP conversion device 6A. Accordingly, audio IP conversion device 1B may have the same constitution as audio IP conversion device 2A, and audio IP conversion device 5B may have the same constitution as audio IP conversion device 6A.

In the first embodiment described above, absolute delay time which is round-trip delay time on transmission lines is derived by transmitting initial packet P1 by audio IP conversion device 1B and receiving initial packet P1 by audio IP conversion device 1B. Meanwhile, it can also be a constitution wherein audio IP conversion device 2A transmits a packet and audio IP conversion device 2A receives the packet, and absolute delay time on transmission lines is derived. Moreover, it is constituted that absolute delay time is derived using initial packet P1 in the first embodiment described above, however, absolute delay time can also be derived by using for example, a packet which is not initial packet P1, and the packet is transmitted after start of transmission of sound data recorded on microphone preamplifier 1A. Also, it can be constituted that delay time derivation section (25) regularly derives absolute delay time.

Furthermore, absolute delay time is round-trip delay time in the first embodiment described above, however, it can also be one-way delay time (delay time in the forward course or the return course). Also, the average of the calculated delay time td1, td2, . . . shown in FIG. 3 can be absolute delay time. Moreover, in the first embodiment described above, control section 25 sets data storage capacity of buffer 22 based on the time obtained when maximum fluctuation time and absolute delay time are added, however, data storage capacity of buffer 22 can be set based only on maximum fluctuation time. In other words, absolute delay time does not have to be known. In this case, a packet communication system is not only applied to a system wherein bidirectional transmission is executable between audio IP conversion device 1B and audio IP conversion device 2A, but can also be applied to a system wherein only unidirectional transmission is executable between audio IP conversion device 1B and audio IP conversion device 2A.

In the first and the second embodiments described above, recording and distribution system SYS is given as an example of a network system which includes a packet communication system, however, it is not limited to such system and the constitution of each embodiment described above can also be applied to an image distribution system and the like. In other words, it is not limited to a system which distributes sound data, but can also be a system which distributes image data. Also, it can be a system which distributes both sound and image data.

Furthermore, in the second embodiment described above, transmission lines are 2 lines (see FIG. 7), however, it can also be a redundant configuration wherein more than three lines of transmission lines are provided.

What is claimed is:
1. A fluctuation absorbing device comprising:
a buffer for temporarily storing packets;
a pulse generating section for generating a pulse at a same interval as a transmitting interval of the packets;
a fluctuation time derivation section for deriving, by a CPU, a fluctuation time of delay of the packets based on the pulse;

a maximum fluctuation time estimate section for estimating, by the CPU, a maximum fluctuation time based on a plurality of fluctuation times derived in the fluctuation time derivation section; and a setting section for setting, by the CPU, data storage capacity of the buffer based on the maximum fluctuation time, wherein the data storage capacity is configured to handle unexpected fluctuation of delay time.

2. A fluctuation absorbing device according to claim 1, wherein the fluctuation time derivation section measures a time from a generating timing of the pulse to a receiving timing of the packets, and derives the fluctuation time based on a measured time.

3. A fluctuation absorbing device according to claim 1, comprising a delay time derivation section for deriving, by the CPU, a delay time of the packets on a transmission line, wherein the setting section sets the data storage capacity of the buffer based on the maximum fluctuation time and the delay time.

4. A fluctuation absorbing device according to claim 1, wherein the maximum fluctuation time estimate section calculates a standard deviation of a plurality of fluctuation times, and estimates the maximum fluctuation time based on the calculated standard deviation.

5. A fluctuation absorbing device according to claim 1, wherein the buffer has a first buffer for temporarily storing a first packet transmitted via one of the transmission lines and a second buffer for temporarily storing a second packet having the same content as the first packet transmitted via the other transmission line; said fluctuation absorbing device comprises a time lag detection section for detecting, by the CPU, a time lag of receiving timings of the first packet and the second packet; and a modification section for modifying, by the CPU, a number of packets stored in the first buffer or in the second buffer and matching the number of the packets of both buffers when the time lag is detected by the time lag detection section.

6. A fluctuation absorbing device according to claim 5, wherein the time lag detection section detects the time lag based on a time stamp added to the packets.

7. A fluctuation absorbing device according to claim 5, wherein the modification section executes a data interpolation processing when the modification section modifies a number of packets stored in the first buffer or in the second buffer.

8. A communication device comprising:

a transmitting and receiving section for transmitting and receiving packets;

a buffer for temporarily storing the packets received by the transmitting and receiving section;

a pulse generating section for generating a pulse at a same interval as a transmitting interval of the packets;

a fluctuation time derivation section for deriving, by a CPU, a fluctuation time of delay of the packets based on the pulse;

a maximum fluctuation time estimate section for estimating, by the CPU, a maximum fluctuation time based on a plurality of fluctuation times derived in the fluctuation time derivation section; and a setting section for setting, by the CPU, data storage capacity of the buffer based on the maximum fluctuation time, wherein the data storage capacity is configured to handle unexpected fluctuation of delay time.

* * * * *